J. W. SIMMONS.
AUTOMOBILE BUMPER.
APPLICATION FILED FEB. 4, 1921.
1,433,661.
Patented Oct. 3 1922.
2 SHEETS—SHEET 1.
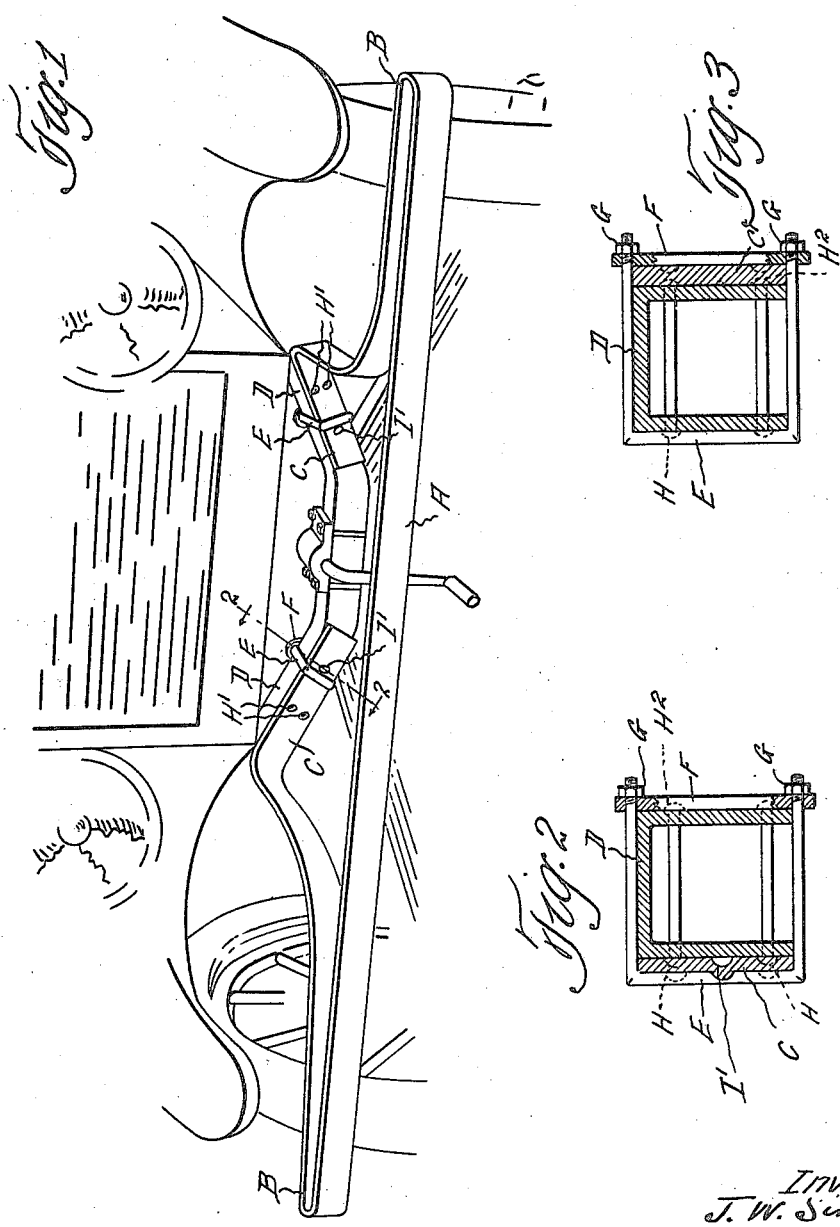

J. W. SIMMONS.
AUTOMOBILE BUMPER.
APPLICATION FILED FEB. 4, 1921.
1,433,661.
Patented Oct. 31, 1922.
2 SHEETS—SHEET 2.
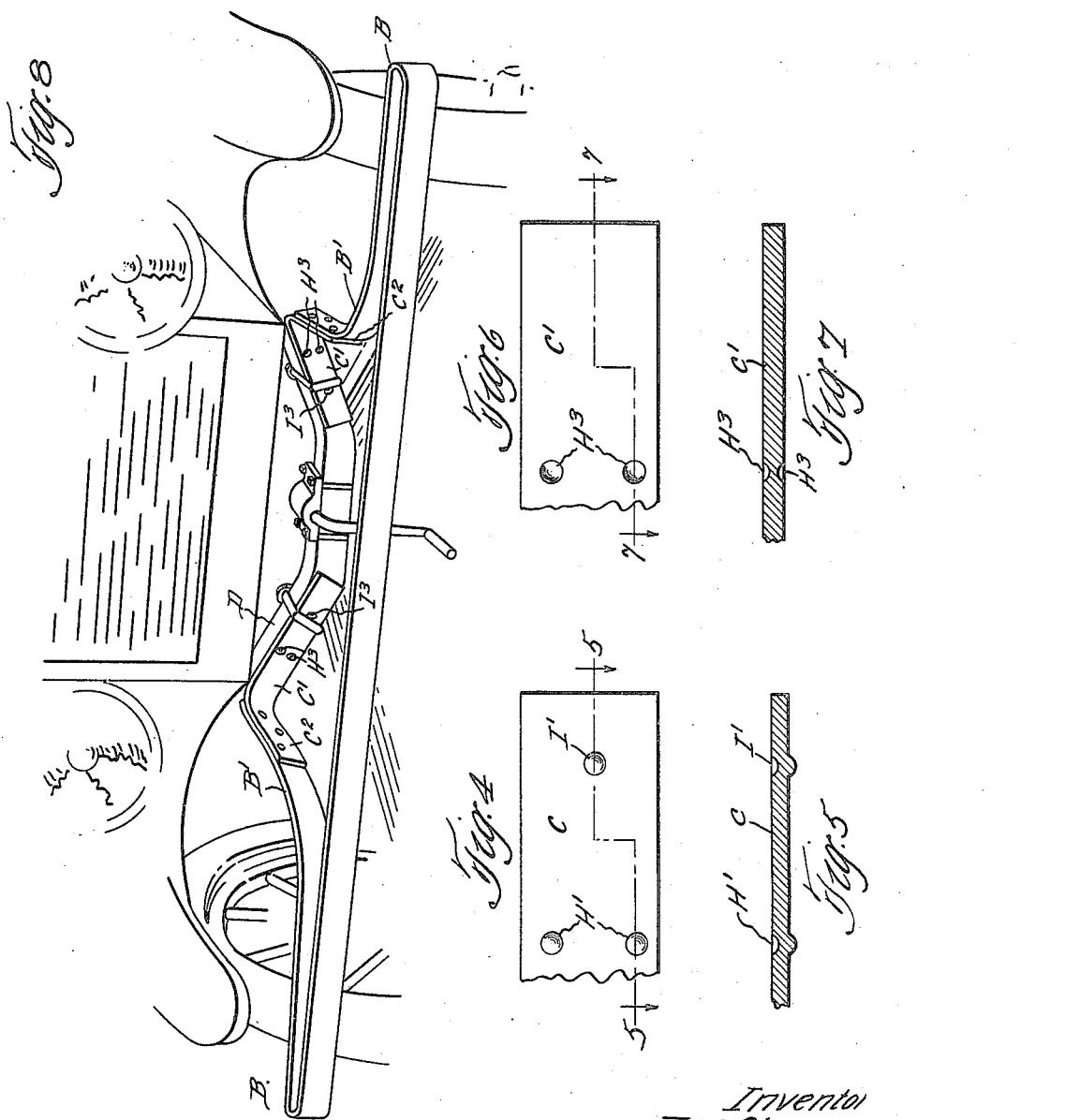

Patented Oct. 31, 1922.

1,433,661

UNITED STATES PATENT OFFICE.

JOHN W. SIMMONS, OF CLEVELAND, OHIO.

AUTOMOBILE BUMPER.

Application filed February 4, 1921. Serial No. 442,350.

*To all whom it may concern:*

Be it known that I, JOHN W. SIMMONS, a citizen of the United States, residing at Cleveland, in the county of Cuyahoga and State of Ohio, have invented a certain new and useful Improvement in Automobile Bumpers, of which the following is a full, clear, and exact description, reference being had to the accompanying drawings.

This invention relates generally to automobile bumpers and more particularly to the manner of connecting the same to the frame of the automobile, and while the invention is particularly adapted for the connection of automobile bumpers to the Ford car the principle thereof can be applied to other cars involving similar frame structure.

The object of the invention is to provide a simple and efficient form of bumper connection which will effectively secure the inner ends of the bumper to the automobile frame; and with this object in view the invention consists in novel features of construction hereinafter fully described and pointed out in the claim.

In the drawings forming a part of this specification Fig. 1 is a perspective view showing the practical application of my invention; Fig. 2 is a detail sectional view on the line 2—2 of Fig. 1; Fig. 3 is a view showing the bumper applied to the rear; Fig. 4 is a face view of the end of the bumper; Fig. 5 is a detail section on the line 5—5 of Fig. 4; Fig. 6 is a detail face view of the bumper end usable on either side of the frame; Fig. 7 is a detail section on the line 7—7 of Fig. 6; and Fig. 8 shows a slight modification of bumper.

Referring to the drawings, A indicates a bumper which is preferably made in one piece although the extreme end portions thereof can be made separate as most clearly shown in Fig. 8.

This bumper is folded upon itself at B, and provided with inwardly and downwardly inclined portions C, which are preferably coextensive in area with converging portions D of the frame of the automobile, and these inclined and converging ends C are securely fastened to the inclined and converging portions of the automobile frame by means of the shackles and clips E passing around the ends of the bumper and the frame members of the automobile, the rear ends of the shackle or clip being passed through a clip plate F arranged upon the rear side of the frame member, and nuts G are employed to complete the connection.

The frame member D is usually a channel member and upon its front and rear sides is provided with rivet heads H near the upper ends; and in practice I prefer to make the converging bumper ends C with sockets or recesses H', these sockets or recesses being so spaced as to receive the rivet heads H therein when the bumper ends C are properly positioned upon the converging portions D of the frame preparatory to having the clip passed around the same; and by providing these sockets or recesses and utilizing the rivet heads of the frame member, I am enabled to securely fasten the bumper ends by means of a single clip; I also provide the end C with an outwardly projecting portion $i'$ which may be pressed out from the end or it may be a rivet head; and by placing the clip adjacent to the projection $i'$, all danger of the clip shifting longitudinally upon the frame member is entirely avoided.

The frame member is also provided with rivet heads $H^2$ upon the rear face thereof and if desired the bumper can be attached to the rear face thereof, and in this instance the sockets or recesses, instead of being punched outwardly from the end of the bumper, are punched inwardly or rearwardly.

The relative position of the sockets or recesses would, therefore, determine whether the bumper was to be used upon the front or rear side of the frame. In case it should be desired to make a bumper usable upon either the front or rear side, the converging end portions of said member could be provided with oppositely disposed sockets or recesses $H^2$ as most clearly shown in Fig. 7.

As previously stated, the bumper is preferably made of one piece, but it is obvious that if desired the converging ends C' and short arm portion $C^2$ could be riveted or otherwise secured to the ends B' which are continuations of the return bends B as most clearly shown in Fig. 8.

It will thus be seen that I provide the simple construction of bumper which can be quickly and easily attached to the frame of the automobile and secured thereto by a minimum number of parts, and when secured will be effectively held in place.

Having thus described my invention, what I claim is:

The combination with the downwardly converging frame members, having protuberances upon the front faces thereof, of an automobile bumper having inclined converging ends, the inner faces of which are provided with recesses to receive the protuberances on the frame members, and clips for securing said ends to said frame members.

In testimony whereof, I hereunto affix my signature.

JOHN W. SIMMONS.